United States Patent
Yu et al.

(10) Patent No.: US 11,208,533 B2
(45) Date of Patent: Dec. 28, 2021

(54) FLAME-RETARDANT AND ABRASION-RESISTANT COMPOSITE

(71) Applicant: NICHING INDUSTRIAL CORP., Chu-Pei (TW)

(72) Inventors: Jian-Yuan Yu, Chuper (TW); Wei-Han Hsiao, Chuper (TW); Hsin-Chen Chung, Chuper (TW)

(73) Assignee: NICHING INDUSTRIAL CORP., Chu-Pei (TW)

(*) Notice: Subject to any disclaimer, the term of this patent is extended or adjusted under 35 U.S.C. 154(b) by 7 days.

(21) Appl. No.: 16/413,650

(22) Filed: May 16, 2019

(65) Prior Publication Data
US 2019/0352473 A1  Nov. 21, 2019

Related U.S. Application Data

(60) Provisional application No. 62/672,609, filed on May 17, 2018.

(51) Int. Cl.
| | | |
|---|---|---|
| *C08J 3/22* | (2006.01) | |
| *C08J 3/12* | (2006.01) | |
| *C08K 3/36* | (2006.01) | |
| *C08K 3/04* | (2006.01) | |
| *C08K 7/24* | (2006.01) | |
| *C08K 5/5399* | (2006.01) | |
| *C08K 5/5397* | (2006.01) | |
| *C08L 67/00* | (2006.01) | |
| *C08L 71/00* | (2006.01) | |
| *C08L 33/02* | (2006.01) | |

(52) U.S. Cl.
CPC ............... *C08J 3/226* (2013.01); *C08J 3/12* (2013.01); *C08K 3/04* (2013.01); *C08K 3/36* (2013.01); *C08K 5/5397* (2013.01); *C08K 5/5399* (2013.01); *C08K 7/24* (2013.01); *C08L 33/02* (2013.01); *C08L 67/00* (2013.01); *C08L 71/00* (2013.01); *C08J 2325/06* (2013.01); *C08J 2333/02* (2013.01); *C08J 2355/02* (2013.01); *C08J 2375/04* (2013.01); *C08J 2377/00* (2013.01); *C08K 2201/005* (2013.01); *C08K 2201/006* (2013.01); *C08K 2201/011* (2013.01); *C08K 2201/013* (2013.01); *C08L 2201/02* (2013.01); *C08L 2203/12* (2013.01)

(58) Field of Classification Search
CPC . C08J 3/226; C08J 3/12; C08J 2333/02; C08J 2377/00; C08J 2375/04; C08J 2325/06; C08J 2355/02; C08K 3/04; C08K 7/24; C08K 5/5399; C08K 5/5397; C08K 3/36; C08K 2201/011; C08K 2201/013; C08K 2201/005; C08K 2201/006; C08L 67/00; C08L 71/00; C08L 33/02; C08L 2203/12; C08L 2201/02
See application file for complete search history.

(56) References Cited

U.S. PATENT DOCUMENTS

| | | | |
|---|---|---|---|
| 7,144,522 B2 * | 12/2006 | Burchill, Jr. | C09D 7/69 252/62 |
| 8,466,225 B2 | 6/2013 | Hayata et al. | |
| 2005/0148692 A1 | 7/2005 | Burchill, Jr. | |
| 2018/0148865 A1 | 5/2018 | Liang et al. | |
| 2018/0313001 A1 | 11/2018 | Dempsey | |

FOREIGN PATENT DOCUMENTS

| | | |
|---|---|---|
| CN | 101831109 A | 9/2010 |
| CN | 103352293 A | 10/2013 |
| CN | 103387712 A | 11/2013 |
| CN | 106496729 A | 3/2017 |
| CN | 107163733 A | 9/2017 |
| CN | 107312166 A | 11/2017 |
| CN | 107365497 A | 11/2017 |
| JP | 2009-270006 A * | 11/2009 |
| JP | 2010248521 A | 11/2010 |
| KR | 1020060133993 A | 12/2006 |
| TW | M536615 U | 2/2017 |
| WO | 2017087511 A1 | 5/2017 |

* cited by examiner

*Primary Examiner* — Robert D Harlan
(74) *Attorney, Agent, or Firm* — Mark M. Friedman

(57) ABSTRACT

A flame-retardant and abrasion-resistant composite is provided, and includes a nano-porous material and a polymer. The nano-porous material includes a plurality of powder having a particle size of less than 20 micrometers. A specific surface area of the powder is 50 to 3,000 m²/g. An amount of the powder is 50 parts per million to 30 wt %. The nano-porous material is dispersedly bound to the polymer and a limiting oxygen index of the composite is greater than or equal to 24%.

11 Claims, 3 Drawing Sheets

FLAME-RETARDANT AND ABRASION-RESISTANT COMPOSITE

FIELD OF INVENTION

The present disclosure relates to a composite, and more particular to a flame-retardant and abrasion-resistant composite composed of a nano-porous material and a polymer.

BACKGROUND OF INVENTION

In order to protect personnel safety and home safety or uses of special purposes, the development and burgeons of flame-retardant products for textile, engineering plastics and building materials is ongoing. Conventional flame-retardant materials are generally placed on a surface of an object in a form of a coating. Such coatings generally have many disadvantages, such as short fire resistance duration, limited protection range, etc. The coatings are easily dropped by friction or are lost along with water during raindrop erosion or cleaning processes. Even if a heated flame-retardant solution is added to the polymer products and perform a heat treatment, the polymer products still have the following disadvantages: the large amount of addition which does not meet the cost saving principle, poor compatibility of the polymer products, flame-retardant exudation, toxicity, smokiness, poor durability of washing, durability of flame-retardant, formaldehyde or heavy metal content exceeding the standard regulations, being not environmentally friendly, and illegal. Furthermore, the addition of a halogen-based flame-retardant often causes environmental pollution and affects the health of a user, but it still cannot solve the problems, such as prone to fraying.

Conventional nano-porous materials are prone to breakage under pressure because of a large number of pores inside the conventional nano-porous materials. In addition, the nano-porous materials have disadvantages of low mechanical strength, lack of stretchability, and structural collapse caused by moisture absorption and being affected with damp, which make the conventional nano-porous difficult to apply in industry.

SUMMARY OF INVENTION

In view of the foregoing, the present disclosure provides a flame-retardant and abrasion-resistant composite to solve the problems that the composite of the prior art does not possess the durability of flame-retardant and durability of abrasion-resistant at the same time.

A primary object of the present disclosure is to provide a flame-retardant and abrasion-resistant composite having enhanced self-extinguishing property (or flame retardancy), long fireproofing time, water washing resistance and durability. The flame-retardant and abrasion-resistant composite can be used for a long time and abrasion-resistant, even if it is used for a long time at a high temperature.

A secondary object of the present disclosure is to provide a flame-retardant and abrasion-resistant composite which processes good compatibility, low price, simple manufacture, soft texture, flexible, flame-retardant, and abrasion-resistant at the same time.

In order to achieve the foregoing objects of the present disclosure, an embodiment of the present disclosure provides a flame-retardant and abrasion-resistant composite, comprising: a nano-porous material comprising a plurality of powder, wherein a plurality of powder has a particle size of less than 20 micrometers, a specific surface area of the powder is 50 to 3,000 m$^2$/g, and an amount of the powder of the nano-porous material is 50 parts per million (ppm) to 30 wt %; and a polymer, wherein the nanometer porous material is dispersedly bound to the polymer;

wherein a limiting oxygen index of the composite is greater than or equal to 24%.

In an embodiment of the present disclosure, the composite satisfies the following inequality: $A_c > A_p$, wherein $A_c$ is an abrasion-resistant cycle of the composite and $A_p$ is an abrasion-resistant cycle of the polymer.

In an embodiment of the present disclosure, the polymer is selected from the group consisting of polyester, polyolefin, polyamide, acrylic, polycarbonate, polyurethane, polystyrene, acrylonitrile-butadiene-styrene copolymer, derivatives thereof, and any combination thereof.

In an embodiment of the present disclosure, the nano-porous material is selected from the group consisting of nano-porous silica, nano-porous carbon, aerogel, and any combination thereof.

In an embodiment of the present disclosure, the aerogel is selected from the group consisting of silica aerogels, metal oxide aerogels, organic aerogels, carbon aerogels, semiconducting metal chalcogenide aerogels, nanotubes aerogels, metal aerogels, and any combination thereof.

In an embodiment of the present disclosure, the composite further comprises a dispersant and an amount of the dispersant is less than or equal to 30 wt %.

In an embodiment of the present disclosure, a host of the dispersant is polyester, polyacrylate, or polyether polymer, and the dispersant comprises at least one hydrophilic functional group.

In an embodiment of the present disclosure, the dispersant comprises at least one type of hydrophilic functional groups.

In one embodiment of the present disclosure, the dispersant is selected from the group consisting of organic acid derivative, wax, acid anhydride copolymer, acrylic acid copolymer, styrene copolymer, copolymer having epoxy functional group, and any combination thereof.

In an embodiment of the present disclosure, the composite further comprises a carbon-forming material.

In an embodiment of the present disclosure, the composite further comprises a flame-retardant.

In an embodiment of the present disclosure, the nano-porous material is connected to the polymer via a chemical bond or an intermolecular force.

In an embodiment of the present disclosure, the composite is configured to form a coating.

In an embodiment of the present disclosure, the composite is configured to form a film, and a thickness of the film is equal to or less than 500 μm.

In an embodiment of the present disclosure, the composite is configured to form a plastic, and a thickness of the plastic is equal to or greater than 500 μm.

In an embodiment of the present disclosure, the composite is configured to form a fiber, and a denier of the fiber is equal to or greater than 0.1 denier.

Compared with the prior art, the present disclosure provides a flame-retardant and abrasion-resistant composite having enhanced self-extinguishing property (or flame retardancy), long fireproofing time, water washing resistance and durability. The flame-retardant and abrasion-resistant composite can be used for a long time and abrasion-resistant, even if it is used for a long time at high temperature. In addition, the surface of the composite of the present disclosure forms a multi-layered nanocomposite structure char layer by carbonization during a combustion process, and the char layer has a compact char structure to improve its flame retardancy. The composite of the present disclosure has a plurality of pores, so that flames, organic volatiles and the like are isolated in the pores, and thus the spread of combustion can be effectively hindered.

Therefore, the flame-retardant and abrasion-resistant composite of the present disclosure processes good compatibility, low price, simple manufacture, soft texture, flexible, flame-retardant, and abrasion-resistant at the same time.

Other features and embodiments of the present disclosure will be further understood from the following detailed description in combination with the drawings.

DETAILED DESCRIPTION OF PREFERRED EMBODIMENTS

Figure 1:
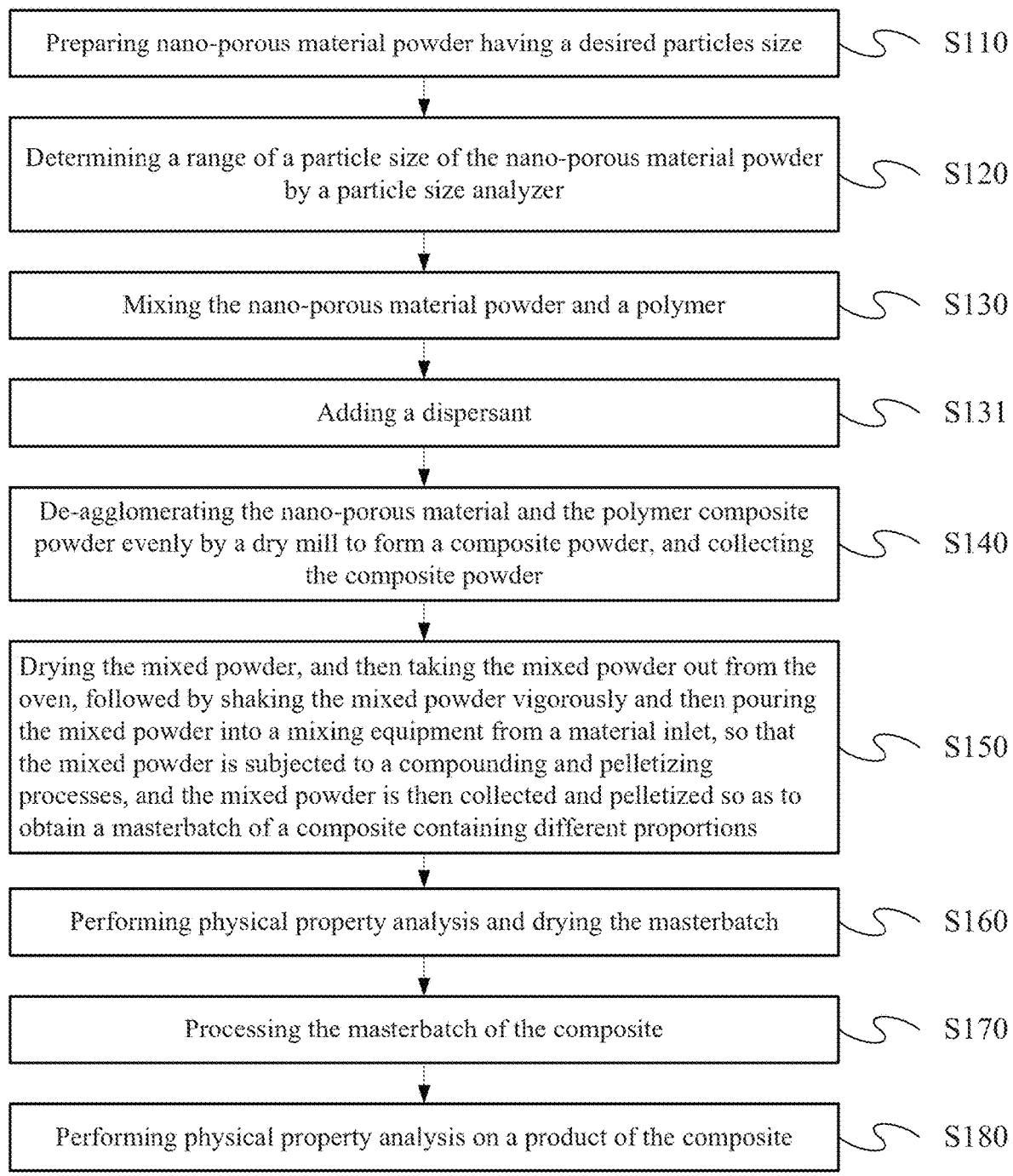
FIG. 1 is a method of manufacturing a functional masterbatch of a composite according to an embodiment of the present disclosure.

For a better understanding of the aforementioned purposes, technical schemes, and advantages of the present disclosure, embodiments of the present disclosure will be further described in detail with reference to the accompanying drawings.

In an embodiment of the present disclosure, a flame-retardant and abrasion-resistant composite is provided, the composite comprising a nano-porous material and a polymer. The nano-porous material can be a plurality of powder, and the nano-porous material or the powder of the nano-porous material is dispersedly bound to the polymer.

A particle size of the powder of the nano-porous material of the present disclosure is less than 20 μm. In an embodiment of the present disclosure, the particle size of the nano-porous material is 0.1 nm to 20 μm or any range or sub-range, for example, 0.1 nm to 20 μm, 1 nm to 20 μm, or 0.1 μm to 0.5 μm, etc.

An average particle size of the powder of the nano-porous material of the present disclosure is less than 20 μm. In an embodiment of the present disclosure, the particle size of the nano-porous material is 0.1 nm to 20 μm or any range or sub-range. In an embodiment of the present disclosure, the average particle size of the powder of the nano-porous material is 0.1 nm, 1 nm, 0.1 μm, 0.2 μm, 0.3 μm, 10 μm, or 20 μm.

At least 10% of a surface of each powder of the nano-porous material is coated by the polymer to form a cladding structure. The cladding structure may be a surface coating or a porous coating. For surface-type coating, the polymer is disposed on the powder of the nano-porous material and is in direct contact with the powder of the nano-porous material. For the porous coating, the polymer forms a plurality of closed, semi-open pores and/or open pores around the powder of the nano-porous material, so that flames, organic volatiles and the like are isolated in the pores, and thus the spread of combustion is effectively hindered.

In one embodiment of the present disclosure, a specific surface area of the powder is 50 to 3,000 $m^2/g$. In an embodiment of the present disclosure, the specific surface area of the powder of the nano-porous material may be 50 to 3000 $m^2/g$, or 80 to 2500 $m^2/g$, or 100 to 2000 $m^2/g$, or 300 to 1200 $m^2/g$, or any range or sub-range thereof.

In one embodiment of the present disclosure, a pore volume of the powder of the nano-porous material is 0.1 to 10 $m^3/g$. In an embodiment of the present disclosure, the pore volume of the powder of the nano-porous material maybe 0.1 to 5 $m^3/g$, or 1 to 5 $m^3/g$, or 1 to $m^3/g$, or 0.1 to 1 $m^3/g$, or any range or sub-range thereof.

In one embodiment of the present disclosure, a BET pore size of the powder of the nano-porous material is 0.1 to 50 nm. In an embodiment of the present disclosure, the BET pore size of the powder of the nano-porous material may be 0.1 to 20 nm, or 1 to 20 nm, or 5 to 20 nm, or 5 to 10 nm, or any range or sub-range thereof.

In one embodiment of the present disclosure, an amount of the powder of the nano-porous material is more than 50 parts per million (ppm). In an embodiment of the present disclosure, the amount of the powder of the nano-porous material is 50 ppm to 30 wt % or 50 ppm to 20 wt %.

The nano-porous material of the present disclosure has a plurality of pores, and thus possesses the characteristics of light weight and high surface energy. The nano-porous material can be classified into microporous material, mesoporous material, and micropores material based on its pore size. A pore diameter of the microporous material is equal to or less than 2 nanometers (nm), for example, methanamide. A pore diameter of the mesoporous material is between 2 nm and 50 nm, for example, dimethylcarbinol. A pore size of the macroporous material is greater than 50 nm, for example, a photocrystalline material. The pores of the nano-porous material may have a plurality of uniform or different pore sizes or shapes and the nano-porous material possesses characteristics of large surface area and high thermal stability. Therefore, it can be used in various applications, such as catalytic reaction, biochemical separation, selective detection, and separation of heavy metals.

Furthermore, the nano-porous material of the present disclosure is selected from the group consisting of nano-porous silica, nano-porous carbon, aerogel, and any combination thereof. The nano-porous silica includes nano-porous material made of silicon or silicon compounds (for example, silicon dioxide, etc.), for example, porous Si, etc. The nano-porous carbon includes nano-porous material made of carbon or a carbon compounds (for example, carbon black, graphite, graphene, etc.), for example, porous carbon and carbon nanotubes. A combination of the nano-porous silica and nano-porous carbon, for example, a silica-carbon composite.

"Aerogel" refers to a gel derived from gels in which liquid components are substituted by gas. In an embodiment of the present disclosure, the aerogel is a group selected from the group consisting of silica aerogels, metal oxide aerogels, organic aerogels, carbon aerogels, semiconducting metal chalcogenide aerogels, nanotubes aerogels, metal aerogels, and any combination thereof.

In an embodiment of the present disclosure, the polymer is selected from the group consisting of polyester, polyolefin, polyamide, acrylic, polycarbonate, polyurethane, polystyrene, acrylonitrile-butadiene-styrene copolymer, derivatives thereof, and any combination thereof.

In one embodiment of the present disclosure, if the nano-porous material has a polar functional group, for example, the silicon of nano-porous silica and silica aerogel which has a hydroxyl group, the nano-porous material is hydrophilic. By changing a functional group on a nano-porous material (for example, the silicon of a nano-porous silica and silica aerogel which has a hydroxyl group) to an alkyl group, for example, a methyl group, so as to change hydrophobicity of the nano-porous material. A functional group of the nano-porous material used herein may be selected from the group consisting of hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, carbonyl, C-carboxylate, O-carboxylate, N thiocarbamate, O thiocarbamate, urea, thiourea, N carbamate, O carbamate, C-amide, N amide, guanyl, guanidine and hydrazine, or a combination thereof, thereby effectively increasing the compatibility and dispersion between the nano-porous material and the polymer. The problem that the composite of the nanometer porous material and the polymer is easily broken is solved, so that the composite of the nano-porous material and the polymer has greater toughness, strength, elongation, and spinnability.

In another embodiment of the present disclosure, the nano-porous material and/or the powder thereof are modified by at least one of the following methods:

(1) surface chemical modification of the nano-porous materials (for example, aerogels) by gaseous reagents; and (2) surface modification of the colloidal particles by incorporating certain chemical additives (for example, by incorporating a proper amount of methyl trimethoxy silane (MTMS) in the sol-gel synthesis, a hydrophobic silica aerogel could be obtained).

In an embodiment of the present disclosure, the nano-porous material and the polymer are connected to each other by a chemical bond or an intermolecular force. The chemical bond can be a covalent bond, an ionic bond, or a coordinate bond. The intermolecular force can be a hydrogen bond or a van der Waals force.

Examples of covalent bonds include a carboxyl group, a halogen group, or a sulfonic acid group on the polymer chain chemically reacts with a hydroxyl group of the nano-porous material to form a stable covalence bond, or the nano-porous material is polymerized with the polymer to form a branch of the polymer or the like. Examples for the ionic bonds include that both the polymer and the nano-porous material are oppositely charged to form an ionic bond via electrostatic attraction. Examples for ionic bonds include that both the polymer and the nano-porous material coordinate with each other by an electron pair and an empty electron orbit to form a coordinate bond.

On the other hand, because the mixing of the conventional nano-porous material and the polymer causes a powder agglomeration effect, the conventional nano-porous material is difficult to uniformly mix with the polymer, and thus causes the nano-porous material to agglomerate and results in an unstable composite. Therefore, in an embodiment of the present disclosure, the composite may further contain a dispersant. An amount of the dispersant is less than or equal to 30 wt %. Therefore, the powder aggregation effect caused by the addition of a high concentration of the nano-porous material in the polymer is reduced, so that the nano-porous material is dispersedly incorporated in the polymer. At the same time, it ensures that the problem of pressure rise in general continuous manufacturing process is improved so as to maintain the pressure within a constant range.

The dispersant may be selected from one of the following dispersants:

(1) copolymers including anhydride, acrylic acid, styrene, or epoxy functional group;

(2) a host of the dispersant is polyester, polyacrylate, or polyether polymer, and the dispersant comprises at least one hydrophilic functional group (for example, acidic group, amino group, alcohol group);

(3) waxes, for example, natural waxes, montan waxes, Synthetical waxes, polyolefin waxes; and (4) organic acid derivatives, for example, fatty acids, stearic acid, fatty acid ester, fatty acid amide, ethylene bis stearamide, saponified fatty acids, zinc stearate, or glycerol ester.

In another embodiment of the present disclosure, a trace amount of a carbon-forming agent, such as Melamine Cyanurate 810 (MC810) as shown in Chemical Formula I, is added to the composite to increase a formation rate of the char layer. The amount of MC810 is about 0.5 wt %.

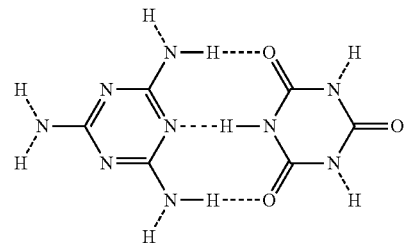

Formula I

In an embodiment of the present disclosure, a flame-retardant is added to the nano-porous composite polymer. The flame-retardant has a phosphorus, nitrogen atom or aromatic ring structure. A phosphorus content of the flame-retardant is 4000 to 7000 ppm. The flame-retardant may be Tetraphenyl 1,4-piperazinediylbis(phosphonate) (FR 115) as shown in Chemical Formula II or bis(4-chlorophenyl)phenyl phosphine oxide (BCPPO) as shown in Chemical Formula III.

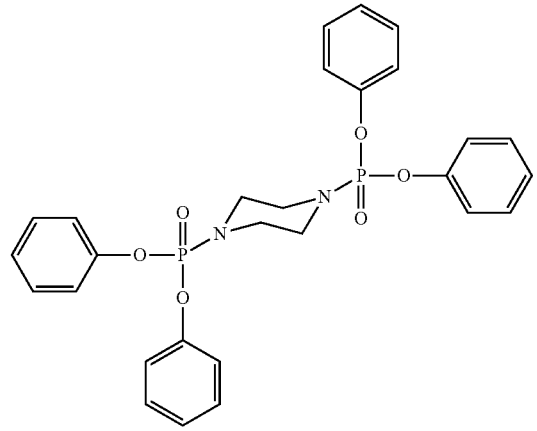

Formula II

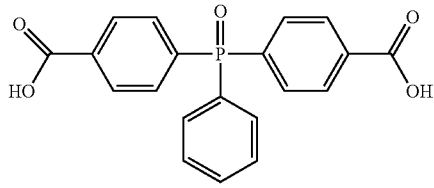

Formula III

The term "limiting oxygen index (L.O.I.)" as used herein refers to a minimum oxygen concentration that a material is required to maintain a combustion state in a mixed gas of oxygen and nitrogen under specified experimental conditions (e.g. atmospheric conditions). The minimum oxygen concentration is expressed as a volume fraction. The limiting oxygen index can be calculated from a final oxygen concentration:

$$L.O.I.=[O_2/(O_2+N_2)]\times100\%$$

In one embodiment of the present disclosure, a limiting oxygen index of the polymer is 18% to 22%. For example, a limiting oxygen index of nylon 6 is about 18% to 20%, and a limiting oxygen index of polyethylene terephthalate (PET) is about 20% to 22%. In an embodiment of the present disclosure, a limiting oxygen index of the composite is 24% or more, for example, 24% to 60%, 24 to 40%, 40% to 60%, etc. When L.O.I. value of the material reaches 24% or more, the material are considered to have the property of self-extinguishment, which is also known as flame-retardant.

The method for manufacturing the nano-porous material of the present disclosure may be selected from the group consisting of sol-gel method, intercalation method, blending method, filling method, and any combination thereof. One of methods for manufacturing aerogel is sol-gel method. The metal salt is uniformly mixed in the solvent. Under catalysis of the catalyst, after a period of hydrolysis and condensation, the sol is gradually formed, and colloidal particles of the sol are uniformly dispersed in the system. After a period of condensation and molding, the colloidal particles form a colloidal, semi-solid polymeric substance that looks like a jelly-like gel. The colloidal substance is called a wet gel. After a structure of the gel is gradually stabilized and forms a strong network structure, the wet gel is washed to remove solvents and unreacted reactants and catalyst in the gel. Finally, the residual solvent in the gel is removed using a supercritical drying technique and other drying technique. Then the dried colloid forms an aerogel.

In addition, by modifying parameters of precursors of the nano-porous material (for example, nano-porous silica), for example, methyl decanoate (TMOS), ethyl phthalate (TEOS), polyoxyalkylene (PEDS), methyl trimethoxy decane (MTMS); an amount of sol; and pH, the specific surface area (BET surface area) of the nano-porous material can be changed.

Manufacturing method of composite:

Composite of the present disclosure can be manufactured using one of the melt processing methods. For example, any blending method commonly used in the plastics industry, including the use of mixing roll, intensive mixer/banbury mixer, kneader, single screw extruder, twin screw extruder, multi screw extruder, etc. The polymer, nano-porous materials, dispersants (optionally), and the like are combined such that the nano-porous material and the dispersant (optionally) are uniformly distributed throughout the polymer to form a functional masterbatch.

Please refer to FIG. 1 which is a method of manufacturing a functional masterbatch of a composite according to an embodiment of the present disclosure, including the following steps:

Step S110: preparing nano-porous material powder having a desired particles size.

Step S120: determining a range of a particle size of the nano-porous material powder by a particle size analyzer.

Step S130: mixing the nano-porous material powder and a polymer.

Step S140: de-agglomerating the nano-porous material and the polymer composite powder evenly by a dry mill to form a composite powder, and collecting the composite powder.

In another embodiment of the present disclosure, step S30 may further includes

Step S131: adding a dispersant into the composite powder, wherein an amount of the dispersant is less than or equal to 30 wt %.

In an embodiment of the present disclosure, the method of manufacturing the functional masterbatch of the composite further includes the following steps:

Step S150: drying the mixed powder at 100 to 120° C. for 14 hours, and then taking the mixed powder out from the oven. The mixed powder is shaken vigorously and then is poured into a mixing equipment from a material inlet thereof. The mixed powder is subjected to a compounding and pelletizing processes using twin screws in 300 rpm at 240 to 280° C. The mixed powder is finally collected and pelletized so as to obtain a masterbatch of a composite containing different proportions.

Step S160: performing physical property analysis the masterbatch of the composite and drying the masterbatch of the composite. The physical property analysis measures physical properties, for example, particle size, specific surface area, or water content of the masterbatch by using corresponding instruments and materials.

Step S170: processing (for example, spinning, injection molding, and/or heat pressing film formation) the masterbatch of the composite to manufacture a corresponding product of the composite (for example, fiber, plastic, film, and/or coating).

Step S180: performing physical property analysis on the product of the composite. The physical property analysis is measured, for example, by a corresponding equipment.

In one embodiment of the present disclosure, a fiber containing the composite of the present disclosure is manufactured by spinning which can manufacture a yarn conforming to a standard specification (for example, 70d/24f). The spinning mainly comprises the following steps:

Step S210: Squeezing the functional masterbatch and the polymer of the present disclosure at a temperature above the melting point thereof through a screw extruder or a gear from a spinneret pore (for example, a spinnerette).

Step S220: cooling and refining into a filamentous solid and winding at the same time.

The produced fibers and/or yarns can be further processed by weaving, refining, etc. to produce various textiles.

A method for manufacturing a plastic containing the composite of the present disclosure in an embodiment of the present disclosure is injection molding, mainly including the following steps:

Step S310: heating the material tube to make the composite is in molten state.

Step S320: pushing the composite forward by the screw and applying a great pressure to inject the composite from a sprue into a filling cavity to form a plastic.

In an embodiment of the present disclosure, the injection molding process can include five stages: mold locking, injection, pressure maintaining, cooling, and mold removing.

A method for manufacturing a film containing the composite of the present disclosure in an embodiment of the present disclosure is a heat pressing film formation, which mainly comprises the following steps:

Step S410: passing the molten composite into the heat pressing machine in a continuous strip form by a screw extruder, and extruding the molten composite between rotating horizontal rollers.

Step S420: independently controlling speed and temperature of each roller, sequentially reducing the minimum distance or the nip between the pairs of continuous rollers to produce a continuous flat plate or film and maintaining strict dimensional tolerance.

In addition to the above various applications, the composite of the present disclosure can also be applied to textile industry, plastic industry, rubber industry, etc. to manufacture various daily necessities, home furnishings, clothing, devices, elements, equipment, building materials, or interior materials for vesicles, etc.

According to an embodiment of the present disclosure, a nano-porous material and a polymer are combined by a Brabender simple mixer to form a composite. The composite is tested by a limiting oxygen index tester (PL16000) to analyze the flame retardancy of the composite which is expressed as a limiting oxygen index.

The burning criterion is that the burning time does not exceed 3 min, the burning length does not exceed 5 cm (if the burning time is more than 3 min, the oxygen concentration is decreased. If the burning time does not exceed 3 min, the oxygen concentration is increased) and the sample size is 6.5×3.0×(70 to 150) mm.

CNS13387 D3195-1994 flammability test for interior materials for vesicles:

The composite of the present disclosure was analyzed by an FMVSS.302 combustion tester. The standard requirements for the test samples are: a width of 100 mm, a length of 355 mm, and a thickness which is less than 13 mm. The results of the test are only shown by qualified or unqualified. The judgement of the result is based on the inability to burn to a chronograph line, i.e. self-extinguishment or stop burning within 60 seconds after the chronograph line. The burning rate is less than 102 mm/min, and the burn length is less than 51 mm. There are at least five groups for each test. Burn time (BT) refers to the time required to burn a burn length (BL) and the calculation for burning rate (BR) is: BR=60×BL/BT.

CNS 10285 L3196-1995 test for flammability of textiles:

According to the regulations, the composite of the present disclosure is analyzed by the 45-degree Bunsen burner. Because a weight of the test sample is less than 450 g/m², the sample is regarded as sheer fabric which is tested using A-1 method. The test results are determined by grading the after-flame time, after-flow time, carbonized area, and carbonized length. Textiles with an area of 350 mm×250 mm are sampled for at least five pieces. The length of the flame is 45 mm and the main components of the fuel are propane and butane.

UL-94 flammability test for plastic materials:

In order to determine the flame retardance of the composite, a vertical burning method is applied, according to the specification of UL-94. The requirements of test samples are: a length of 125±5 mm, a width of 13±0.5 mm, and a thickness which is less than 13 mm for textiles; and a length of 125.80 mm, a width of 12.96 mm, and a thickness of 0.86 mm for plastic specimen. A 20 mm high blue flame is applied to at least five samples for 10 seconds and removed. After measuring the first burn time, immediately reapply the blue flame and measures the second burn time. Finally, the samples are graded by the burn time, completely carbonization time, whether it is burned to the holding clamp, or whether the molten droplet ignites cotton which are measured in the tests.

Abrasion test:

The analysis was carried out according to the standard of ASTM D3884-2009. A roller (CS-10) having a load of 1 kilogram is used. The valuation of abrasion-resistant property is determined by abrasion. After performing the sampling process (twill, 120×80), the sample must be subjected to scouring process before undergoing the abrasion-resistant test.

The equipment used for the scouring process is rapid stainer and the used formulation are: scouring agent (WX-24) 1 g/L, NaOH (s) 1 g/L, the ratio of textile to dye agent (liquid ratio)=1:20, and 100° C.×30 min.

The technical solutions of the embodiments of the present disclosure will be illustrated completely and clearly in combination with the following drawings of the embodiments of the disclosure. Apparently, the described embodiments are merely a few rather than all of the embodiments of the present disclosure. All other embodiments obtained by persons of ordinary skill in the art based on the embodiment of the present disclosure without creative efforts shall fall within the protection scope of the present disclosure.

It should be understood that in order to present inventive concepts of the present disclosure in brief, the nano-porous materials in the following various embodiments are exemplified by carbon aerogels, and other nano-porous materials (for example, silica aerogels, etc.) also have similar effects as carbon aerogels. Furthermore, the polymers in the following various examples are exemplified by nylon 6 and PET. Other polymers (for example, polycarbonate or the like) also have similar effects as nylon 6 and PET.

First Embodiment

In a first embodiment of the present disclosure, a composite is provided and includes a nano-porous material and a polymer. The nano-porous material is a carbon aerogel (hereinafter referred to as nano-porous carbon, NPC) and the polymer is nylon 6 or PET.

As shown in Table 1 which presents physical properties (for example: strength and fiber elongation analysis) of a textile (for example, a yarn, a garter, etc.) made of a flame-retardant and abrasion-resistant composite according to a first embodiment of the present disclosure.

In the first embodiment, 0.05%, 0.01%, and 0.5% of NPC bound to nylon 6 or PET to form a composite, which is processed into a yarn by a spinning process to perform fiber strength and fiber elongation analysis. Results in Table 1 show that the fiber strength of yarns manufactured by adding different concentrations of nano-porous materials. A fiber strength of conventional nylon 6 is about 4.06 g/denier (g/d) and a fiber elongation thereof of conventional nylon 6 is 61.8%. Fiber strengths of the yarns of the composites manufactured by 0.05%, 0.1% and 0.5% NPC are 4.19 g/d, 4.13 g/d, and 3.74 g/d. Therefore, the fiber strength of the yarn manufactured by the composite having 0.05% and 0.1% of NPC and nylon 6 is greater than the conventional nylon 6.

TABLE 1

| | Specification of fiber (d/f) | Fiber strength (g/d) | Fiber elongation (%) | Specification of textile |
|---|---|---|---|---|
| Nylon 6 | 100/24 | 4.06 | 61.8 | 120 × 80 |
| 0.05% NPC-Nylon 6 | 100/24 | 4.19 | 63.2 | 120 × 80 |
| 0.1% NPC-Nylon 6 | 100/24 | 4.13 | 60.7 | 120 × 80 |
| 0.5% NPC-Nylon 6 | 100/24 | 3.74 | 67.9 | 120 × 80 |
| PET | 100/24 | 3.73 | 25.7 | 120 × 80 |
| 0.05% NPC-PET | 100/24 | 3.68 | 25.6 | 120 × 80 |
| 0.1% NPC-PET | 100/24 | 3.64 | 25.9 | 120 × 80 |
| 0.5% NPC-PET | 100/24 | 3.45 | 25.7 | 120 × 80 |

Second Embodiment

In a second embodiment of the present disclosure, a composite is provided and includes a nano-porous material and a polymer. The nano-porous material is a carbon aerogel (hereinafter referred to as NPC), and the polymer is nylon 6.

According to results of the second embodiment, although a simple mixer is used in combination with a heat pressing process, NPC is added to the nylon 6 and is subjected to a L.O.I. measurement. Compared with the blank nylon 6, the L.O.I. value is increased as an amount of NPC added increases, thereby achieving a preliminary flame-retardant effect.

TABLE 2

| | Limiting oxygen index (%) |
|---|---|
| Nylon 6 | 19.5 |
| 0.05 wt % NPC-Nylon 6 | 20 |
| 1.0 wt % NPC-Nylon 6 | 23 |
| 10 wt % NPC-Nylon 6 | 30 |

Third Embodiment

In a third embodiment of the present disclosure, a composite is provided and includes a nano-porous material and a polymer. The nano-porous material is a carbon aerogel (hereinafter referred to as NPC) and the polymer is nylon 6.

Figure 2:
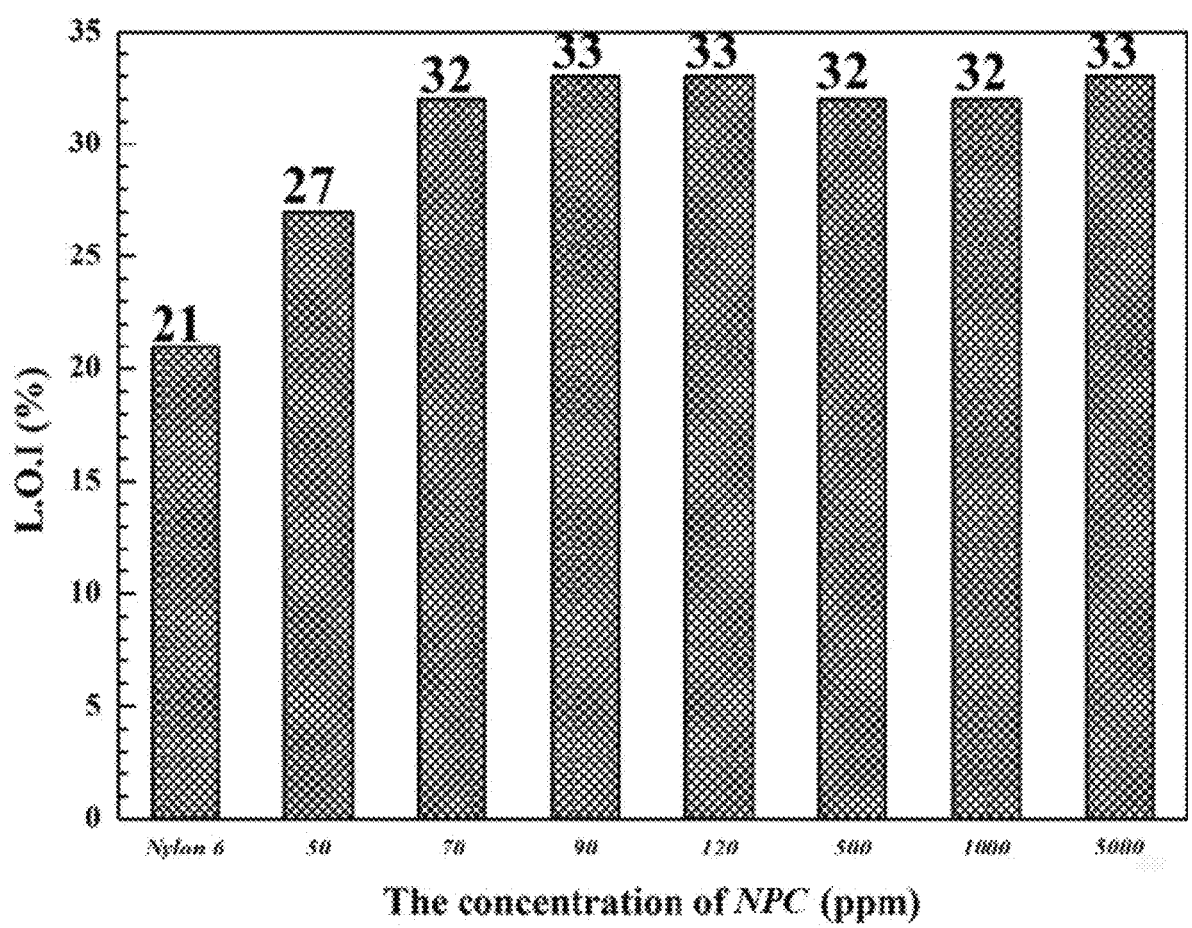
FIG. 2 is a bar graph of the limiting oxygen index analysis of the garter of the flame-retardant and abrasion-resistant composite according to the first embodiment of the present disclosure.

Limiting oxygen index analysis:

Please refer to FIG. 2 which is a bar graph of a limiting oxygen index analysis of the garter of the flame-retardant and abrasion-resistant composite according to the third embodiment of the present disclosure. In the third embodiment, 50, 70, 90, 120, 500, 1000, and 5000 ppm of NPC are combined with the fibers of the composite which is made of nylon 6. The fibers are subject to L.O.I. analysis after being woven into a garter. Results in FIG. 2 shown that the L.O.I. analyses of garters which are made of different concentrations of nano-porous material. It is clearly observed that the L.O.I. is 27% under a concentration of 50 ppm of NPC which is 1.29 times of the L.O.I. of the conventional nylon fiber. The L.O.I keep rising until the concentration is greater than 70 ppm, which the L.O.I. tends to a stable value of 32±1% which is 1.52 times of the L.O.I. of the conventional nylon fiber. Therefore, the addition of at least 50 ppm of the nano-porous material of the third embodiment of the present disclosure has a more remarkable flame retarding ability than that of general nylon fiber.

Fourth Embodiment

In a fourth embodiment of the present disclosure, a composite is provided and includes a nano-porous material and a polymer. The nano-porous material is silica aerogel (hereinafter referred to as NPS), and the polymer is a nylon 6.

First, 60 grams of nano-porous silica material, 14 grams of Tetraphenyl 1,4-piperazinediylbis (phosphonate), 10 grams of Melamine Cyanurate, and 1940 grams of nylon 6 powder (RV 2.7) were mixed to form mixed powder. The mixed powder are then collected into a bag, and then pour into a dry mill for dry milling. The dry milling time is one minute. After this step is completed, the mixed powder is laid on an iron plate and dried at 105° C. for 14 hours to carry out mixing granulation experiment via a twin-screw extruder. In the flame-retardant and endurance mixing granulation process, the mixed powder dried at 105° C. for 14 hours and is taken out from the oven, poured into the mixing equipment from the material inlet for mixing and granulation, and then the masterbatch is collected. A temperature of the mixing granulation is 235 to 270° C.

Thereafter, fiber spinning and garter weaving were performed, and the silica nano-porous material-Nylon 6 masterbatch are dried at 100° C. for 14 hours prior to the spinning process in order to ensure that the moisture content of the masterbatch pellets is lower than 800 ppm. The masterbatch pellets are then poured into the spinning machine from the material inlet. Fiber spinning process is performed to prepare an NPS-Nylon yarn in a standard specification of 70d/24f. The yarn is woven into a garter. Finally, after a scouring process, the textile is subjected to a limiting oxygen index (L.O.I.) test for determining the flammability of the textile. Result shows that the garter made of the composite has an L.O.I. value of 29. Therefore, the composite of the present disclosure having a silica nano-porous material or carbon nano-porous material has a flame-retardant ability superior to a flame-retardant ability of general nylon fiber.

Fifth Embodiment

Figure 3:
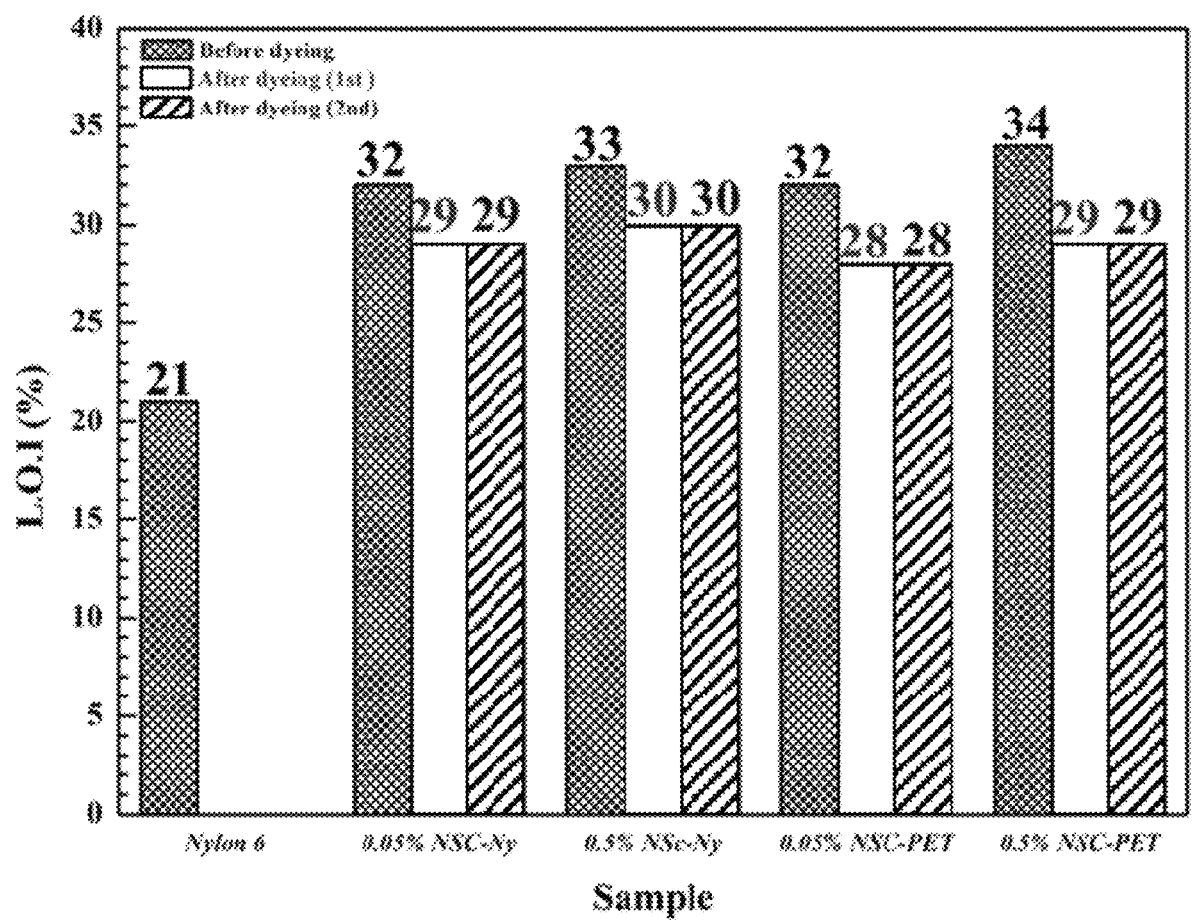
FIG. 3 is a bar graph of the limiting oxygen index analysis of the flame-retardant and abrasion-resistant composite according to the second embodiment and the third embodiment of the present disclosure before and after dyeing.

Please refer to FIG. 3 which is a bar chart of limiting oxygen index analyses of the flame-retardant and abrasion-resistant composite according to the first embodiment of the present disclosure before and after the first dyeing and the second dyeing. In the fifth embodiment, fibers which are made of 0.05% and 0.5% of NPC with nylon 6 is woven into a textile, for example, a garter and is subjected to limiting oxygen index analyses. Results in FIG. 3 show the limiting oxygen index analyses of the garters made of NPC-Nylon and NPC-PET containing different concentrations of NPC before and after dyeing processes. The L.O.I. of 0.05% and 0.5% NPC-Nylon are 32% and 33%. These results show that NPC can effectively enhance flame retardance even at a low concentration. Furthermore, after the garter is dyed, the L.O.I of 0.05% and 0.5% NPC-Nylon are 29% and 30%, respectively. Therefore, the nano-porous material in the fifth embodiment of the present disclosure still has a remarkable flame retardancy after multiple dyeing and has a limiting oxygen index 38 to 43% greater than the limiting oxygen index of the general nylon fiber.

Sixth Embodiment

In a sixth embodiment of the present disclosure, a composite is provided and includes a nano-porous material and a polymer. The nano-porous material is carbon aerogel and the polymer is nylon 6. In order to further determine the flame retardancy of the composite, the composite was subjected to CNS13387 D3195-1994 flammability test for interior materials for vesicles.

Table 3 shows the results of CNS 13387 D3195-1994 for NPC-Nylon textile. A total of ten groups are tested. All groups are evenly burned and extinguished before the chronograph line. As a result, the burning rate is 0 mm/min and the result is qualified as self-extinguishing (SE) which indicates that NPC-Nylon meets the requirements for flammability of interior materials for interior textiles of vesicles which effectively prevent the fire source from causing rapid combustion and NPC-Nylon avoids being burnt out and producing toxic gases. Meanwhile, NPC-Nylon possesses flame-retardant and self-extinguishing properties so that NPC-Nylon can increases the survival rate of users in a vehicle accident.

TABLE 3

| Test items | Test results | | |
|---|---|---|---|
| | Burn length (mm) | Burn time (sec) | Burning rate (mm/min) |
| 1 | 0 | 0 | — |
| 2 | 0 | 0 | — |
| 3 | 0 | 0 | — |
| 4 | 0 | 0 | — |
| 5 | 0 | 0 | — |
| 6 | 0 | 0 | — |
| 7 | 0 | 0 | — |
| 8 | 0 | 0 | — |
| 9 | 0 | 0 | — |
| 10 | 0 | 0 | — |
| Average | 0 | 0 | — |
| Burning status | | Self-extinguishing | |

Seventh Embodiment

In a seventh embodiment of the present disclosure, a composite is provided and includes a nano-porous material and a polymer. The nano-porous material is a carbon aerogel and the polymer is nylon 6. In order to further determine the flame-retardant property of the composite, the composite was subjected to a test for flammability of textiles CNS 10285 L3196-1995.

Table 4 shows the results of flammability test CNS 10285 L3196-1995 for textiles products. NPC-Nylon is rated as class 1 flame resistance. NPC-Nylon effectively prevents tiny fire from burning or prevents the fire source from causing rapid combustion. NPC-Nylon avoid ignition, expansion of combustion, generation of a large amount of toxic gases, and self-extinguishing characteristics.

TABLE 4

| | | Test results | | | | |
|---|---|---|---|---|---|---|
| Test items | | After-flame time (sec) | After-flow time (sec) | Carbonized area (cm³) | Ignition time (sec) | Carbonized length (cm) |
| Ignition for 1 minute | warp | 0 | 0 | 18.5 | — | 5.0 |
| | weft | 0 | 0 | 7.2 | — | 3.0 |
| Inflaming after 3 seconds | warp | 0 | 0 | 6.1 | 4 | 5.5 |
| | weft | 0 | 0 | 11.3 | 4 | 15.0 |

Eighth Embodiment

In an eighth embodiment of the present disclosure, a composite is provided, the composite comprising a nano-porous material and a polymer. The nano-porous material is a carbon aerogel and the polymer is nylon 6.

In the present embodiment, the nano-porous composite polymer NPC-Nylon is exemplified. Table 5 shows the results of UL-94 test for the textile which is made of NPC-Nylon under the standard regulation condition (temperature 23±2° C., relative humidity 50±5%, 48 hours). Table 6 shows the results of UL-94 test for the textile which is made of NPC-Nylon under the heat aging condition (temperature 70±1° C., 168 hours). The results show that under the standard adjustment condition, the textile which is made of NPC-Nylon have a burn time and a burn time of spark are zero. Only the cotton is ignited by the high temperature melt droplets; Under the heat aging conditions, the samples only had a very short burn time ranging from 0 to 2.3 seconds. The burn time of spark is still zero and the resulting droplets also ignite cotton, which is rated a V2 grade. Therefore, the nano-porous material and polymer composite can rapidly extinguish and stop the combustion in a short period of time after being ignited under the standard condition and the heat aging condition. Meanwhile, the nano-porous material and polymer composite possesses the ability to prevent ignition, fire expansion, and the formation of a large amount of toxic gases.

TABLE 5

| Standard regulation condition test | Burn time t1 (sec) | Burn time of spark t2 (sec) | Burn time t3 (sec) | Burns to holding clamp? | Droplets ignite cotton? |
|---|---|---|---|---|---|
| 1 | 0 | 0 | 0 | No | Yes |
| 2 | 0 | 0 | 0 | No | Yes |
| 3 | 0 | 0 | 0 | No | Yes |
| 4 | 0 | 0 | 0 | No | Yes |
| 5 | 0 | 0 | 0 | No | Yes |

TABLE 6

| Heat aging condition test | Burn time t1 (sec) | Burn time of spark t2 (sec) | Burn time t3 (sec) | Burns to holding clamp? | Droplets ignite cotton? |
|---|---|---|---|---|---|
| 1 | 0 | 0 | 0 | No | Yes |
| 2 | 2.3 | 0 | 0 | No | Yes |
| 3 | 1.6 | 0 | 0 | No | Yes |
| 4 | 2.2 | 0 | 0 | No | Yes |
| 5 | 1.1 | 0 | 0 | No | Yes |

Ninth Embodiment

In a ninth embodiment of the present disclosure, a composite is provided and includes a nano-porous material and a polymer. The nano-porous material is a carbon aerogel and the polymer is nylon 6 or PET. Table 7 shows the results of abrasion tests performed on the nano-porous material and polymer composite polymers NPC-Nylon 6 containing different concentrations of NPC. As shown in Table 7, abrasion-resistant cycles of the conventional nylon 6 are 2800 cycles, while abrasion-resistant cycles of 0.05% of NPC-Nylon and 0.1% of NPC-Nylon are significantly increased by 63% to 71% compared to the conventional nylon 6. In addition, abrasion-resistant cycles of the conventional PET are 650 cycles, while abrasion-resistant cycles of 0.05% NPC-PET and 0.5% NPC-PET is significantly increased by 97% to 51% compared with conventional PET.

TABLE 7

| | Specification of fiber (d/f) | Specification of textile | Abrasion cycle 1 (cycles) |
|---|---|---|---|
| Nylon 6 | 100/24 | 120 × 80 | 2800 |
| 0.05% NPC-Nylon | 100/24 | 120 × 80 | 4560 |
| 0.1% NPC-Nylon | 100/24 | 120 × 80 | 4800 |
| PET | 100/24 | 120 × 80 | 650 |
| 0.05% NPC-PET | 100/24 | 120 × 80 | 890 |
| 0.5% NPC-PET | 100/24 | 120 × 80 | 980 |

Tenth Embodiment

In a tenth embodiment of the present disclosure, a composite is provided and includes nano-porous material and a polymer. The nano-porous material is a carbon aerogel and the polymer is nylon 6 or PET. A plastic including the composite is manufactured by injection molding process, such as a test specimen. The plastic is subjected to flammability test for plastic materials UL-94.

Table 8 the results of UL-94 test for the plastic specimen which is made of 1% NPC-Nylon under the standard condition. The results show that under the standard adjustment condition, the plastic specimen which are made of NPC-Nylon have a burn time and a burn time of spark are zero, which is rated a V2 grade. Therefore, the plastic including the composite also possesses a good flame retardancy.

TABLE 8

| Standard regulation condition test | Burn time t1 (sec) | Burn time of spark t2 (sec) | Burn time t3 (sec) | Burns to holding clamp? | Droplets ignite cotton? |
|---|---|---|---|---|---|
| 1 | 0 | 0 | 0 | No | Yes |
| 2 | 0 | 0 | 0 | No | Yes |
| 3 | 0 | 0 | 0 | No | Yes |
| 4 | 1.5 | 0 | 0 | No | Yes |
| 5 | 0 | 1.5 | 0 | No | Yes |

In summary, the present disclosure provides a flame-retardant and abrasion-resistant composite having enhanced self-extinguishing property (or flame retardancy), long fire-proofing time, water washing resistance and durability. The flame-retardant and abrasion-resistant composite can be used for a long time and abrasion-resistant, even if it is used for a long time at high temperature. In addition, the surface of the composite of the present disclosure forms a multi-layered nanocomposite structure char layer by carbonization during a combustion process, and the char layer has a compact char structure to improve its flame retardancy. The composite of the present disclosure has a plurality of pores, so that flames, organic volatiles and the like are isolated in the pores, and thus the spread of combustion can be effectively hindered.

Therefore, the flame-retardant and abrasion-resistant composite of the present disclosure processes good compatibility, low price, simple manufacture, soft texture, flexible, flame-retardant, and abrasion-resistant at the same time.

Although the present invention has been described with preferred embodiments thereof, the above preferred embodiments are not used to limit the present invention. One of ordinarily skill in the art can carry out changes and modifications to the described embodiment without departing from the scope and the spirit of the invention that is intended to be limited only by the appended claims.

The invention claimed is:

1. A flame-retardant and abrasion-resistant composite, comprising:
   a nano-porous material comprising a plurality of powder, wherein a plurality of powder has a particle size of less than 20 micrometers, a specific surface area of the powder is 50 to 3,000 m2/g, and an amount of the powder of the nano-porous material is 50 parts per million (ppm) to 30 wt %;
   a polymer, wherein the nanometer porous material is dispersedly bound to the polymer; and
   a dispersant, wherein an amount of the dispersant is less than or equal to 30 wt %, the dispersant has a host that is polyester, polyacrylate, or polyether polymer, and comprises at least one hydrophilic functional group; or the dispersant is selected from the group consisting of organic acid derivatives, wax, acid anhydride copolymer, acrylic acid copolymer, styrene copolymer, copolymer having epoxy functional group, and any combination thereof;
   wherein an oxygen limiting index of the composite is greater than or equal to 24%;
   wherein the composite further comprises a dispersant and an amount of the dispersant is less than or equal to 30 wt %; and
   wherein the composite further comprises a carbon-forming material.

2. The flame-retardant and abrasion-resistant composite of claim 1, wherein the composite satisfies the following inequality: Ac>Ap, wherein Ac is an abrasion-resistant cycle of the composite and Ap is an abrasion-resistant cycle of the polymer.

3. The flame-retardant and abrasion-resistant composite of claim 1, wherein the polymer is selected from the group consisting of polyester, polyolefin, polyamide, acrylic, polycarbonate, polyurethane, polystyrene, acrylonitrile-butadiene-styrene copolymer, derivatives thereof, and any combination thereof.

4. The flame-retardant and abrasion-resistant composite of claim 1, wherein the nano-porous material is selected from the group consisting of nano-porous silica, nano-porous carbon, aerogel, and any combination thereof.

5. The flame-retardant and abrasion-resistant composite of claim 4, wherein the aerogel is selected from the group consisting of silica aerogels, metal oxide aerogels, organic aerogels, carbon aerogels, semiconducting metal chalcogenide aerogels, nanotubes aerogels, metal aerogels, and any combination thereof.

6. The flame-retardant and abrasion-resistant composite of claim 1, wherein the composite further comprises a flame-retardant.

7. The flame-retardant and abrasion-resistant composite of claim 1, wherein the nano-porous material is connected to the polymer via a chemical bond or an intermolecular force.

8. The flame-retardant and abrasion-resistant composite of claim 1, wherein the composite is configured to form a coating.

9. The flame-retardant and abrasion-resistant composite of claim 1, wherein the composite is configured to form a film, and a thickness of the film is equal to or less than 500 μm.

10. The flame-retardant and abrasion-resistant composite of claim 1, wherein the composite is configured to form a plastic, and a thickness of the plastic is equal to or greater than 500 μm.

11. The flame-retardant and abrasion-resistant composite of claim 1, wherein the composite is configured to form a fiber, and a denier of the fiber is equal to or greater than 0.1 denier.

* * * * *